United States Patent [19]
Chikuma

[11] Patent Number: 5,454,438
[45] Date of Patent: Oct. 3, 1995

[54] ELECTRIC POWER STEERING SYSTEM

[75] Inventor: Isamu Chikuma, Maebashi, Japan

[73] Assignee: NSK Ltd., Tokyo, Japan

[21] Appl. No.: 220,545

[22] Filed: Mar. 31, 1994

[51] Int. Cl.$^6$ .................................................. B62D 5/04
[52] U.S. Cl. ................................................... 180/79.1
[58] Field of Search ............................ 180/79.1, 79, 146, 180/147; 74/488 PS

[56] References Cited

U.S. PATENT DOCUMENTS

| | | | |
|---|---|---|---|
| 4,650,019 | 3/1987 | Yanai et al. | 180/79.1 |
| 5,044,454 | 9/1991 | Kanazawa et al. | 180/79.1 |
| 5,165,495 | 11/1992 | Fujii | 180/79.1 |

FOREIGN PATENT DOCUMENTS

| | | | |
|---|---|---|---|
| 64868 | 3/1988 | Japan | 180/79.1 |
| 306971 | 12/1988 | Japan | 180/79.1 |
| 86683 | 4/1991 | Japan | 180/79.1 |
| 186476 | 8/1991 | Japan | 180/79.1 |
| 3-128565 | 12/1991 | Japan . | |
| 6-1118 | 1/1994 | Japan . | |

*Primary Examiner*—Kevin T. Hurley
*Attorney, Agent, or Firm*—Shapiro and Shapiro

[57] ABSTRACT

In order to provide an electric power steering system of small size whose output shaft has little play, a pressure member of the electric-driven power steering system compresses a duplex bearing, more specifically, presses two bearing components of the duplex bearing against each other. As a result, the play which the output shaft has in each bearing is removed.

13 Claims, 3 Drawing Sheets

ELECTRIC POWER STEERING SYSTEM

BACKGROUND OF THE INVENTION

1. Field of the Invention

The present invention relates to an electric power steering system.

2. Related Background Art

An electric power steering system for a vehicle is known in which the torque output from an electric motor for generating assist steering effort is reduced by a gear box in order to transmit proper torque and velocity to the output shaft of the steering system (see, for example, Japanese Utility Model Appln. Laid-Open No. 3-128565).

The electric power steering system disclosed in the above-mentioned reference has a housing whose bored cavity is formed by working one side of the housing so that two rolling bearings can be arranged in said bored cavity with high concentricity.

In the above-mentioned conventional electric power steering system, the end portions of the output shaft are supported by ball bearings. So, not only the housing should have a space for the ball bearing which is arranged near the electric motor, but also the output shaft should be considerably long. As a result, this type of electric power steering system cannot be mounted on a car which cannot afford sufficient space. In order to solve this problem, the diameter of the output shaft, and accordingly the dimensions of the steering system may be reduced by employing a needle bearing or a slide bearing instead of the ball bearing which is arranged at the innermost recess of the bored cavity of the housing. In this case, however, countermeasures should be necessary against the vibration and/or the noise generated by the output shaft which plays in its axial direction.

SUMMARY OF THE INVENTION

An object of the present invention is to provide an electric power steering system of small size whose output shaft has little play.

In order to achieve the above-mentioned object, the electric power steering system according to the present invention may comprise:

a housing which has a bored cavity formed by working one side of the housing;

a motor which is attached to the housing;

an output shaft which is inserted in the bored cavity of the housing and which has a worm gear around its outer periphery in order to be connected with the motor and transmit the output of the motor;

a worm wheel which engages with the worm gear;

a first bearing means arranged near the motor to revolvably support the output shaft; and a second bearing means arranged near the innermost recess of the bored cavity of the housing to revolvably support one of the end portions of the output shaft, wherein said first bearing means includes a duplex bearing and a pressure member for compressing the duplex bearing, while said second bearing means is a bearing whose outer diameter is smaller than that of the duplex bearing.

In the electric power steering system according to the present invention, the pressure member compresses the duplex bearing, that is, presses the two bearing components against each other so that the play which the bearings give the output shaft can be prevented.

DESCRIPTION OF THE PREFERRED EMBODIMENTS

Now, an embodiment of the electric power steering system according to the present invention will be described in detail with reference to the drawings.

Figure 1:
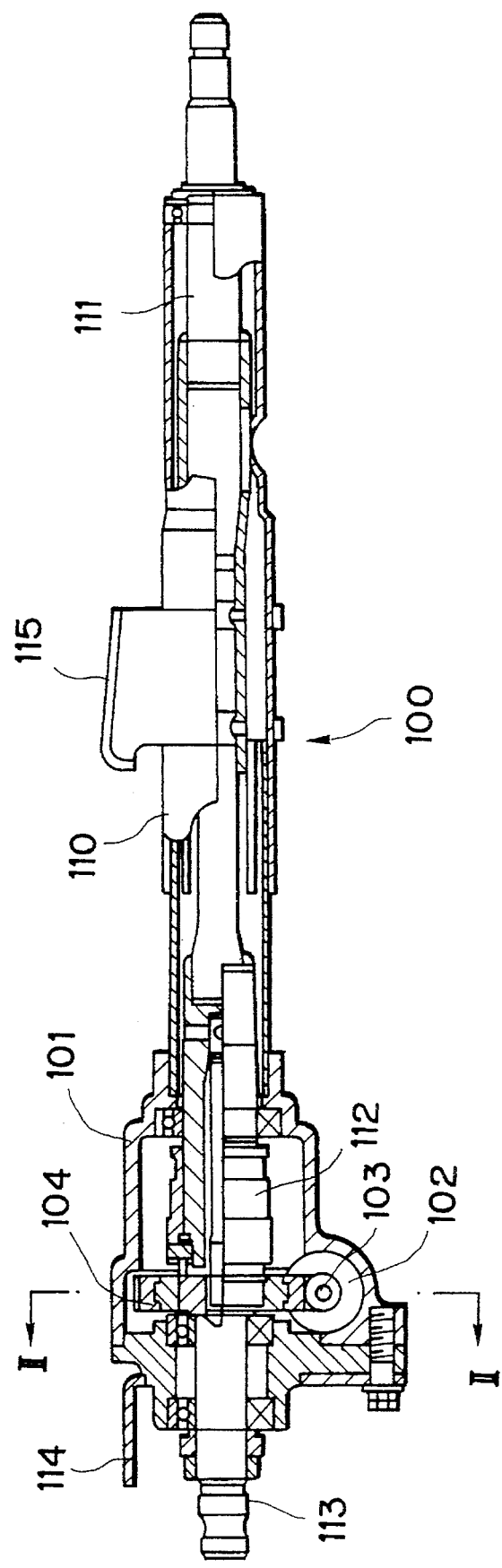
FIG. 1 is a partially cross-sectional view showing an embodiment of the electric power steering system 100 according to the present invention, in which the power steering system is shown along its axis.

FIG. 1 is a partially cross-sectional view showing the embodiment of the electric power steering system 100 according to the present invention, in which the power steering system is shown along its axis.

As shown in FIG. 1, the electric power steering system 100 includes a housing 101 and a tube 110 protruding from the housing 100. The housing 101 is fixed to the vehicle body (not shown) by a bracket 114 while the tube 110 is fixed to the vehicle body by a bracket 115. An input shaft 111 one end of which is to be connected with the steering wheel (not shown) is inserted in and revolvably supported by the tube 110. The other end of the input shaft 111 is connected with a torque detection device 112.

A transmission shaft 113 which is inserted in and revolvably supported by the housing 101 is also connected with the torque detection device 112. The transmission shaft 113 is further connected with a steering device (not shown) to transmit the torque for turning the wheels. As the torque detection device 112 for detecting the relative torque between the input shaft 111 and the transmission shaft 113 and properly controlling the assist steering effort according to the detected relative torque is well known, the construction thereof will not be described below in detail.

In the vicinity of the torque detection device 112, a worm wheel 104 is provided coaxially with the transmission shaft 113. The worm wheel 104 engages with a worm 103a (see FIG. 2) of an output shaft 103, which is arranged along the direction perpendicular to the plane of FIG. 1. The output shaft 103 is connected with a rotation shaft (not shown) of a motor 102 part of which is shown in FIG. 1.

The functions of the electric power steering system 100 shown in FIG. 1 will be described below. When torque for turning the wheels is applied through the steering wheel (not shown), the input shaft 111 is rotated. At the same time, the torque generated from the rotation of the input shaft 111 is transmitted through the torque detection device 112 to the transmission shaft 113. Note that the transmission shaft 113 is connected with the steering device (not shown), as described before, in order to transmit the torque for turning the wheels. The torque detection device 112 detects the magnitude of the torque, and the detected value is sent to a decision circuit (not shown) to be compared with a predetermined value. If the detected value of the magnitude of the torque is greater than the predetermined value, the assist steering effort is judged to be required. Then, a drive command is issued to drive the motor 102. The motor 102 driven according to the drive command rotates the output shaft 103, and the torque is transmitted through the worm wheel 104 to the transmission shaft 113.

On the other hand, if the value of the magnitude of the torque detected by the torque detection device 112 is smaller than the predetermined value, the assist steering effort is judged to be unnecessary. In this case, the motor 102 is not driven.

Figure 2:
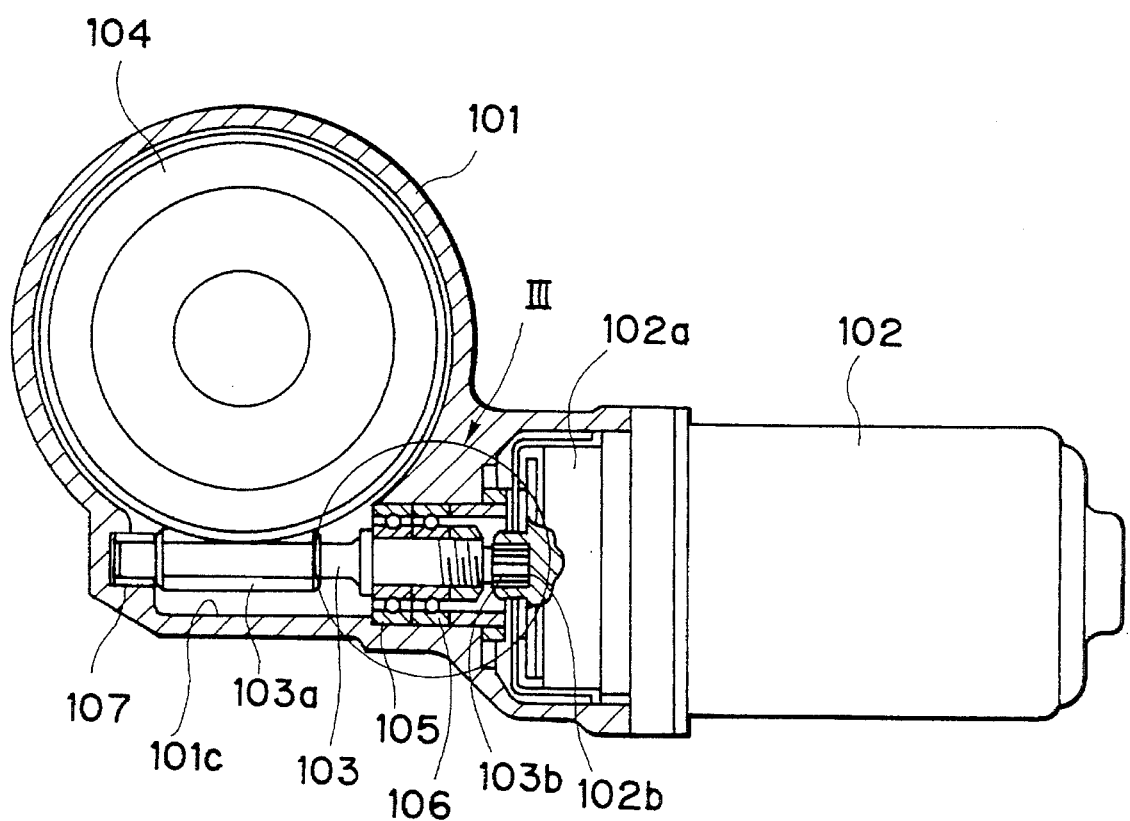
FIG. 2 is a view showing the cross-section of the power steering system cut as indicated by II—II in FIG. 1.

FIG. 2 is a view showing the cross-section of the power steering system cut as indicated by II—II in FIG. 1. As shown in FIG. 2, the electric motor 102 is attached to the right side of the housing 101. The rotation shaft (not shown) of the electric motor 102 is connected via a clutch mechanism 102*a* with the output shaft 103. The clutch mechanism 102*a* and the output shaft 103 are connected with each other, by arrangement of an internal serration 102*b* formed in the clutch mechanism 102*a* engages with the external serration 103*b* formed around the output shaft 103.

A duplex ball bearing (bearing components 105 and 106) serving as parts of a first bearing means is arranged near the motor 102 in a pouched bored concavity 101*c* of the housing 101, while a slide bearing (bush) 107 serving as a second bearing means is arranged at the innermost recess of the bored cavity 101*c*. Both of the bearing means revolvably support the respective end portions of the output shaft 103. Incidentally, the bored cavity 101*c* is formed by boring the housing 101 while the housing 101 is worked, wherein the side on which the motor 102 is attached is cut, for example, with a drill. As the outer diameter of the slide bearing 107 is smaller than those of the bearing components 105 and 106, the slide bearing 107 and the output shaft 103 can be put in the bored concavity 101*c* of the housing 101 from the side to which the motor 102 is attached.

Figure 3:
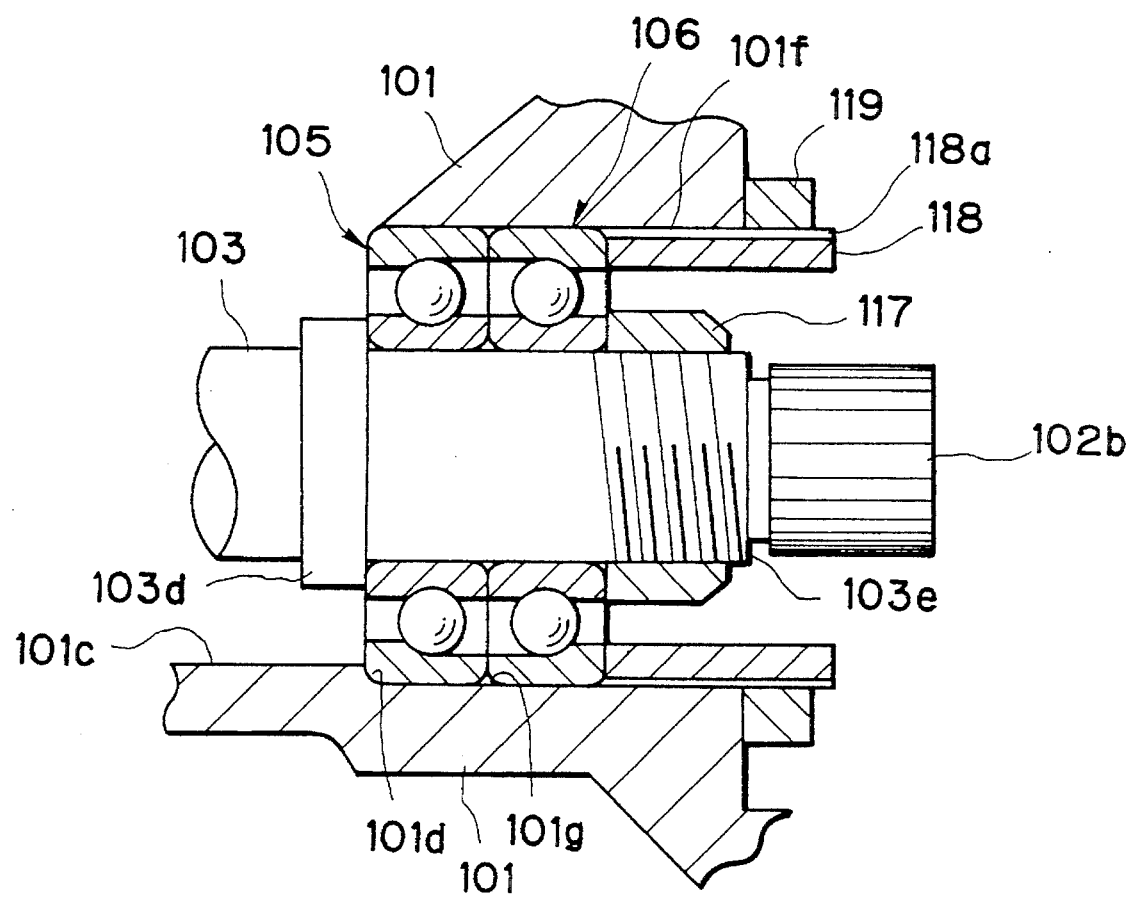
FIG. 3 is an enlarged view showing the part III shown in FIG. 2.

FIG. 3 is an enlarged view showing the part III in FIG. 2. As shown in FIG. 3, the bored cavity 101*c* of the housing 101 has a large-diameter portion 101*g* and a step 101*d* at the end of the large-diameter portion 101*g*. The outer rings of the bearing components 105 and 106 of the duplex ball bearing are held in the large-diameter portion 101*g*, wherein the outer ring of the bearing component 105 is in contact with the step 101*d*. The output shaft 103 has a collar portion 103*d* and is held in the inner rings of the bearing components 105 and 106, with the collar portion 103*d* being in contact with the inner ring of the bearing component 105. A thread portion 101*f* is formed near the motor 102 (right side in FIG. 3) in the bored cavity 101*c* to engage with a thread portion 118*a* formed around the outer periphery of a bearing cap 118. When the bearing cap 118 is fastened, the outer ring of the bearing component 105 comes in contact with the step 101*d* and the outer rings of the bearing components 105 and 106 are compressed between the bearing cap 118 and the step 101*d*. Note that the bearing cap 118 serves as the pressure member and that the duplex bearings (105, 106) and the bearing cap 118 constitute the first bearing means.

The duplex bearing (105, 106) is a; well known face-to-face duplex bearing of pre-load type (cf. JIS,B-0104), so it will not be described in detail here. When the bearing components 105 and 106 are put together in the housing 101 as shown in FIG. 3, the outer rings of these bearing components 105 and 106, whose widths are properly designed, are compressed and pressed against each other, thereby preventing play between the outer rings and balls and between the balls and the inner rings. Accordingly, by fastening the bearing cap 118 so that the end faces of the outer rings are suitably pressed against each other, the duplex bearing comes to have substantially no play both in its axial direction and in the radial directions. One end portion of the outer periphery of the bearing cap 118 engages with a lock nut 119, which prevents the bearing cap 118 from coming off and maintains the proper preload an the duplex bearing components (105, 106).

A thread portion 103*e* is formed near the external serration 103*b* around the output shaft. A bearing nut 117 which engages with the thread portion 103*e* presses the inner ring of the bearing component 106 toward the collar portion 103*d* in order to prevent the bearing components 105 and 106 from shifting along the output shaft 103. In the above-mentioned construction, the output shaft 103 is revolvably supported in the housing 101 with little play. Thus, vibration and/or the noise can be effectively prevented.

Note that the embodiment described above is not limiting of the present invention, and various modifications and revisions are possible within the scope of the invention. For example, the slide bearing 107 may be replaced by a needle bearing.

In the electric power steering system according to the present invention, the pressure member compresses the duplex bearing, that is, presses the bearing components of the duplex bearing against each other, as described before. Thus, as the play which the output shaft has in the bearings is removed, the vibration and/or the noise associated with such play can be prevented.

What is claimed is:

1. An electric power steering system comprising:

a housing which has a bored cavity formed by working one side of the housing;

a motor which is attached to said one side of the housing;

an output shaft which is inserted in the bored cavity of the housing and which has a worm gear around its outer periphery in order to be connected with the motor and transmit an output of the motor;

a worm wheel which engages with the worm gear;

first bearing means arranged near said one side of the housing to revolvably support the output shaft; and second bearing means arranged near an innermost part of the bored cavity, opposite from said one side of the housing, to revolvably support an end portion of the output shaft, wherein said first bearing means includes a duplex bearing and a pressure member adjacent to said duplex bearing for compressing the duplex bearing, and said second bearing means is a bearing of outer diameter smaller than that of the duplex bearing.

2. An electric power steering system according to claim 1, wherein inner races of first and second bearing units of said duplex bearing are entrapped between a collar portion of said output shaft and a retaining member attached to said output shaft.

3. An electric power steering system according to claim 1, wherein outer races of first and second bearing units of said duplex bearing are entrapped between said pressure member and a step formed in said cavity.

4. An electric power steering system according to claim 1, wherein said pressure member is threaded to said housing and axially presses an outer race of a first bearing unit of said duplex bearing.

5. An electric power steering system according to claim 4, wherein said pressure member is fixed by a locking member engaged therewith.

6. An electric power steering system according to claim 5, wherein said locking member is threaded to said pressure member.

7. An electric power steering system comprising:
- a housing having one side to which a motor is attached, said housing including a cavity with a relatively large diameter portion near said one side of the housing and a relatively small diameter portion near an opposite side of the housing;
- an output shaft received in the cavity, said output shaft having a worm gear around an outer periphery thereof and a first end portion connected to the motor to transmit an output of the motor;
- a worm wheel which engages with the worm gears
- a first bearing disposed in said relatively large diameter portion of the bore and revolvably supporting the output shaft, said first bearing being constituted by a duplex bearings
- a pressure member which compresses said duplex bearings and
- a second bearing of smaller outer diameter than said duplex bearing, said second bearing being disposed in said relatively small diameter portion of the bore and revolvably supporting a second end portion of the output shaft.

8. An electric power steering system according to claim 7, wherein inner races of first and second bearing units of said duplex bearing are entrapped between a collar portion of said output shaft and a retaining member attached to said output shaft.

9. An electric power steering system according to claim 7, wherein outer races of first and second bearing units of said duplex bearing are entrapped between said pressure member and a step formed in said relatively large diameter portion of said cavity.

10. An electric power steering system according to claim 7, wherein said pressure member is threaded into said relatively large diameter portion of said cavity and axially presses an outer race of a first bearing unit of said duplex bearing.

11. An electric power steering system according to claim 10, wherein said pressure member is fixed by a locking member engaged therewith.

12. An electric power steering system according to claim 11, wherein said locking member is threaded to said pressure member.

13. An electric power steering system according to claim 7, wherein said cavity has an inner end wall disposed axially beyond said second end portion of said output shaft.

* * * * *